United States Patent [19]

Greenstein et al.

[11] Patent Number: 5,784,617

[45] Date of Patent: Jul. 21, 1998

[54] RESOURCE-CAPABILITY-BASED METHOD AND SYSTEM FOR HANDLING SERVICE PROCESSOR REQUESTS

[75] Inventors: Paul Gregory Greenstein, Fishkill; John Ted Rodell, Wappingers Falls; Michael Allen Wright, Croton-on-Hudson, all of N.Y.

[73] Assignee: International Business Machines Corporation, Armonk, N.Y.

[21] Appl. No.: 758,618

[22] Filed: Nov. 27, 1996

Related U.S. Application Data

[62] Division of Ser. No. 380,932, Jan. 31, 1995, which is a continuation of Ser. No. 999,418, Dec. 31, 1992, abandoned.

[51] Int. Cl.$^6$ ..................................................... G06F 13/14
[52] U.S. Cl. ........................ 395/674; 395/672; 395/184.01
[58] Field of Search ................................. 375/674; 395/672, 395/184.01

[56] References Cited

U.S. PATENT DOCUMENTS

| | | | |
|---|---|---|---|
| 3,611,307 | 10/1971 | Podvin | 340/172.5 |
| 3,768,074 | 10/1973 | Sharp et al. | 395/325 |
| 4,381,542 | 4/1983 | Binder et al. | 364/200 |
| 4,455,601 | 6/1984 | Griscom et al. | 364/DIG. 1 |
| 4,648,029 | 3/1987 | Cooper et al. | 364/200 |
| 4,740,910 | 4/1988 | Sakata et al. | 364/900 |
| 4,748,558 | 5/1988 | Hirosawa et al. | 395/650 |
| 4,777,591 | 10/1988 | Chang et al. | 364/200 |
| 4,839,798 | 6/1989 | Eguchi et al. | 395/650 |
| 4,843,541 | 6/1989 | Bean et al. | 395/856 |
| 4,894,828 | 1/1990 | Novy et al. | 371/11.3 |
| 4,914,570 | 4/1990 | Peacock | 364/200 |
| 5,031,089 | 7/1991 | Liu et al. | 364/200 |
| 5,056,007 | 10/1991 | Collins, Jr. et al. | 364/DIG. 1 |
| 5,095,420 | 3/1992 | Eilert et al. | 395/400 |
| 5,109,515 | 4/1992 | Laggis et al. | 395/728 |
| 5,129,078 | 7/1992 | Groves et al. | 395/550 |
| 5,133,071 | 7/1992 | Sato et al. | 395/700 |
| 5,146,564 | 9/1992 | Evans et al. | 395/250 |
| 5,153,909 | 10/1992 | Beckle et al. | 379/265 |
| 5,155,854 | 10/1992 | Flynn et al. | 395/725 |
| 5,307,495 | 4/1994 | Seino et al. | 395/650 |
| 5,345,590 | 9/1994 | Ault et al. | 395/650 |
| 5,349,682 | 9/1994 | Rosenberry | 395/800 |
| 5,371,848 | 12/1994 | Casey et al. | 395/161 |
| 5,386,512 | 1/1995 | Crisman et al. | 395/200 |
| 5,392,397 | 2/1995 | Elko et al. | 395/200 |

FOREIGN PATENT DOCUMENTS

0372411A2  6/1990  European Pat. Off. ........ G06F 11/00

OTHER PUBLICATIONS

IBM Technical Disc. Bulletin vol. 27 No. 8, Feb. 1985, R.T. Coffin et al. "Enhanced Collection and Recording of Computer System Hardware/Software Event Trace Data and System Error Data" pp. 4669-4671.

IBM Technical Disc. Bulletin vol. 33 No. 3A, Aug. 1990, L.E. Johnson et al. "Data Width And Format Conversion Subsystem For A Graphics Coprocessor".

*Primary Examiner*—Lucien U. Toplu
*Attorney, Agent, or Firm*—Lawrence D. Cutter; Heslin & Rothenberg PC

[57] ABSTRACT

A method and system are provided for executing a service processor request within a data processing system having one or more processors within a central processing complex, each of the processors within the central processing complex including allocatable processor resources. Each of the processors within the central processing complex is provided with the capability of processing selected service processor requests by reserving a portion of the allocatable processor resources within each of the processors for such purpose. A service processor request within the central processing complex is initially processed utilizing at least one of the processors in response to receiving a service processor request, if sufficient processor resources are available to process the service processor request within the reserved portion of the allocatable resources. Alternatively, the service processor request is transmitted to an external processing complex, if insufficient processor resources are available to process the service processor request within the reserved portion of the allocatable resources.

15 Claims, 7 Drawing Sheets

RESOURCE-CAPABILITY-BASED METHOD AND SYSTEM FOR HANDLING SERVICE PROCESSOR REQUESTS

This application is a division of application Ser. No. 08/380,932 filed Jan. 31, 1995, which is a continuation of application Ser. No. 07/999,418 filed Dec. 31, 1992, now abandoned.

BACKGROUND OF THE INVENTION

1. Technical Field

The present invention relates in general to an improved data processing system and in particular to a method and system for providing increased processing power for processing service processor requests within a data processing system. Still more particularly, the present invention relates to a method and system for automatically transferring service processor requests to other service processors within a data processing system.

2. Description of the Related Art

In the field of computer systems, a service processor is usually an independent device connected to a central processing complex (CPC) of a mainframe computer via a bus and/or a direct channel, also called a service channel. A central processing complex (CPC) is defined as those portions of a system, exclusive of I/O control units and devices, that can be controlled by a single operating system. A CPC typically consists of main storage, one or more central processing units, time-of-day clocks, and channels, which are or can be placed in a single configuration.

The functions of a service processor generally include for example, monitoring the work of the CPC, interfacing with the hardware operator on the system console, which is connected to the service processor, recording hardware errors, performing operator initiated manual actions (such as starting and stopping the central processors (CP)), recovering the CPC after errors, managing the initial microcode load, and initiating software initial program load. Some service processors are connected to external networks such as local area networks (LANs) or wide area networks (WANs).

Referring to FIG. 1, a conventional service processor configuration known in the prior art is depicted. Service processor 100 is illustrated as coupled to CPC 102 via bus 104. Service processors typically include a set of devices for support such as: a console, a direct access storage device (DASD), and communications channels. A service processor also may include some or all of the logical entity referred to as the service call logical processor (SCLP), which provides communication with the operating system executing on the CPC and performs its requests. Presently, on mainframe computers from International Business Machines Corporation, the fastest SCLP command execution is about 0.6 seconds, including data transfer in both directions for a maximum of 4096 data bytes being transferred. Furthermore, service processor execution speed for operating system requests is typically quite slow, compared to the speed of the CPC. The execution of service processor requests by the service processor also is performed serially in most cases. The typical service processor also is limited in terms of storage (i.e., memory) and DASD, which may impose additional limitations and delays on execution of service processor requests.

For recovery purposes in case of failure, service processors may be duplexed with one service processor serving as a back up to another service processor, wherein the back up service processor is ready to perform a takeover in the event that the primary service processor should fail. For a single service processor, one method of recovery (warm start) is to reinitialize its microcode. Such a recovery is a relatively lengthy action and while it is in progress, the service processor is inoperative and unavailable to the CPC and the operator.

Thus, it should be apparent that service processors are expensive and slow to handle various operating system requests, CPC requests, system console operator requests, and telecommunication port requests.

Therefore, it would be desirable to have a method and system for processing various service requests without all of the limitations of present service processor systems.

SUMMARY OF THE INVENTION

It is therefore one object of the present invention to provide an improved data processing system.

It is another object of the present invention to provide a method and system for providing increased processing power for processing service processor requests within a data processing system.

It is yet another object of the present invention to provide a method and system for automatically transferring service process or requests to other service processors within a data processing system.

The foregoing objects are achieved as is now described. A method and system are provided for executing a service processor request within a data processing system having a number of processors within a central processing complex, each of the processors within the central processing complex including allocatable processor resources. Each of the processors within the central processing complex is provided with the capability of processing selected service processor requests by allocating a portion of the allocatable processor resources within each of the processors for such purpose. A service processor request within the central processing complex is initially processed utilizing at least one of the processors in response to receiving a service processor request, if sufficient processor resources are available to process the service processor request within the allocated portion of the allocatable resources. Alternatively, the service processor request is transmitted to an external processing complex, if insufficient processor resources are available to process the service processor request within the allocated portion of the allocatable resources or if the CPC is in a recovery state.

The central processing complex may also be coupled to a second central processing complex which also includes a number of processors which each include allocatable processor resources. The second central processing complex may process a service process request, if the first central processing complex is unable to process the service processor request. A hardware service element, such as a computer, may also be provided for processing the service processor request, if either or both of the central processing complexes have insufficient allocatable resources allocated to process the service processor request.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
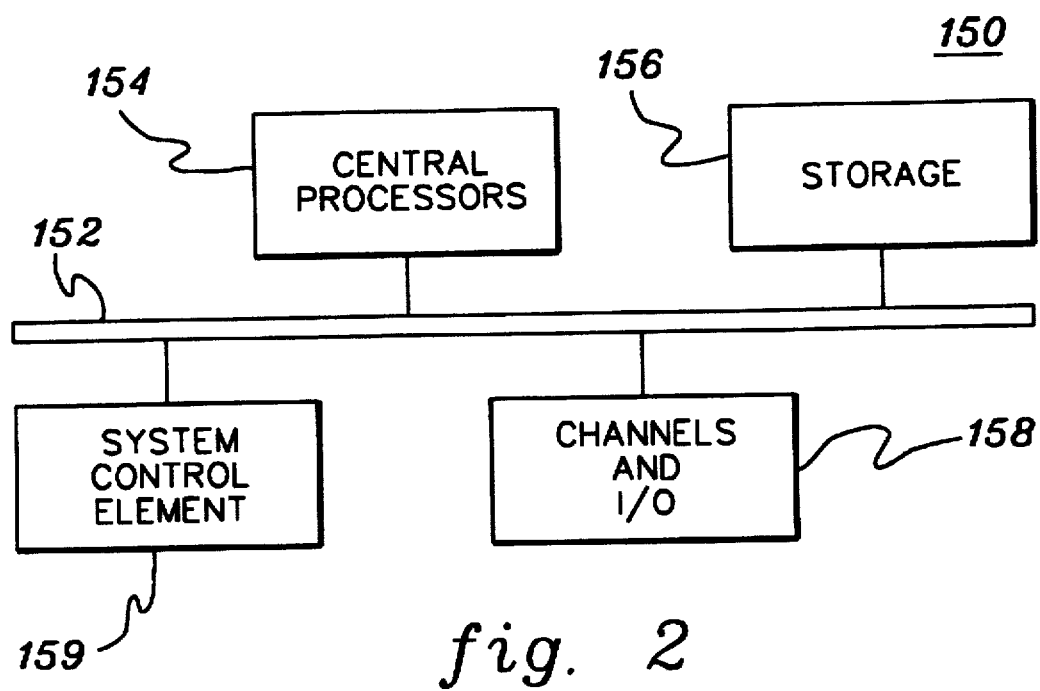
FIG. 2 is a block diagram of a central processing complex in accordance with a preferred embodiment of the present invention.

With reference now to the figures and in particular with reference to FIG. 2, a block diagram of a central processing complex which is provided in accordance with a preferred embodiment of the present invention is illustrated. CPC 150 includes bus 152, which is coupled to all of the hardware elements within the CPC. The hardware of CPC 150 includes central processors 154, storage 156, channels and input/output (I/O) ports 158, and system control element (SCE) 159. Such hardware elements and their configurations and connections to bus 152 are well known to those skilled in the art.

In accordance with a preferred embodiment of the present invention, each CPC includes a layer of microcode which may be utilized to provide central processors with the facility to perform functions typically executed or processed by a service processor, in accordance with a preferred embodiment of the present invention. This layer of microcode is referred to herein as the service processor/control program (SVP/CP). When a particular service processor function is to be executed by a CPC, in response to a service processor request, a selected percentage of central processor unit (CPU) time may be spent executing that function. Allocating processor resources means the allocation of CPU instruction cycles, which may be achieved by various methods, such as: (1) SVP/CP appropriating instruction cycles as needed; (2) SVP/CP using preallocated reserved CPU instruction cycles periodically; (3) SVP/CP running in a logical partition under a hypervisor, such as the Processor Resource/System Manager (PR/SM) on machines executing in logically partitionned (LPAR) mode; or (4) dedicating a subset of CPUs in a configuration having more than one CPU for use by SVP/CP. As a result, in a system provided in accordance with the method and system of the present invention, service processor requests for the entire configuration may be executed primarily within the CPCs, at CPC speeds.

Figure 3A:
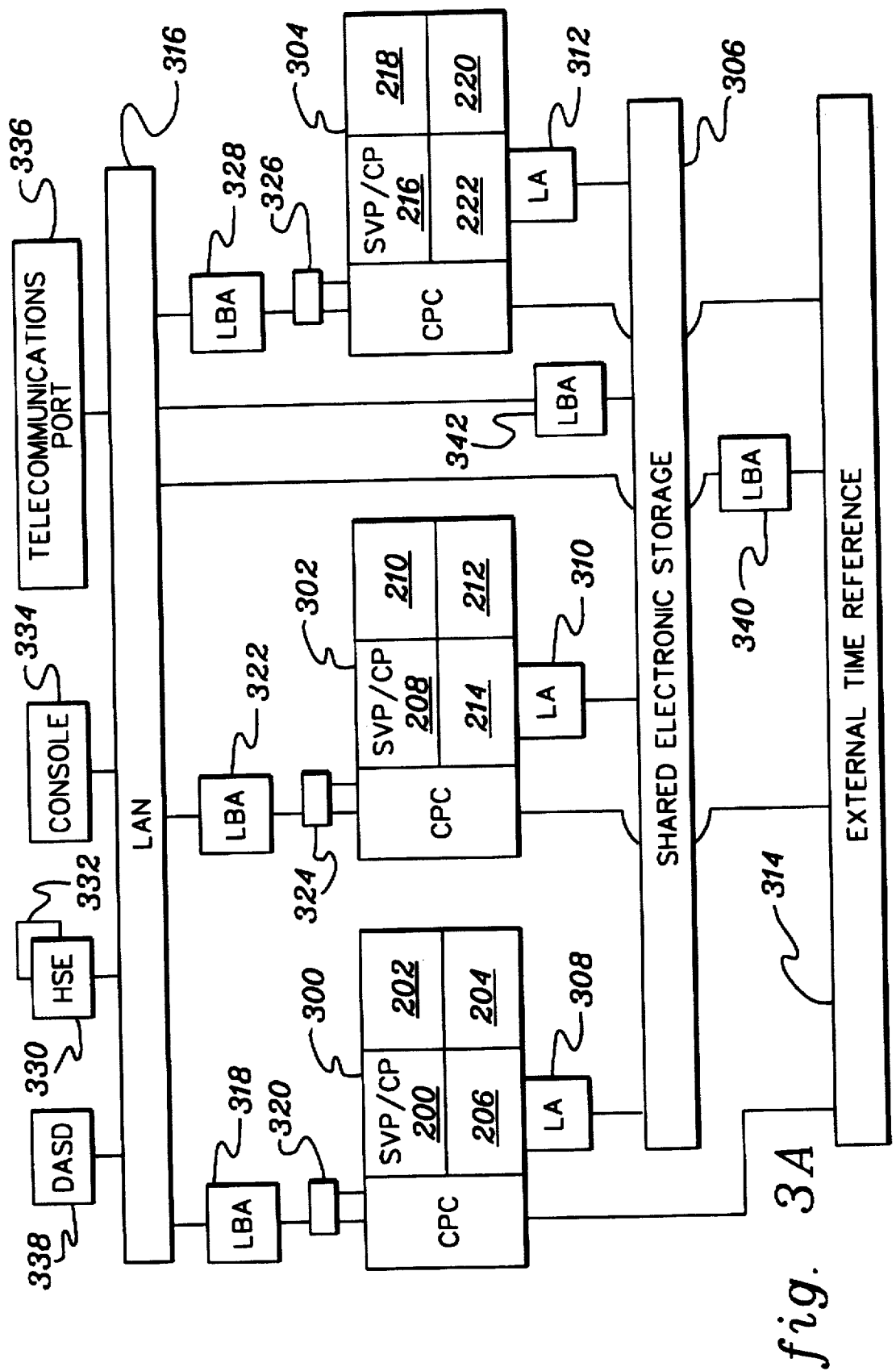
FIG. 3A depicts a block diagram of a data processing system incorporating a service processor system in accordance with a preferred embodiment of the present invention.

Referring now to FIG. 3A, a block diagram of a data processing system incorporating a service processor system provided in accordance with a preferred embodiment of the present invention is depicted. As illustrated, CPCs 300, 302, and 304 are coupled to each other via shared electronic storage (SES) 306, forming a network for managing all service processor requests and permitting each CPC to "backup" another CPC. CPC 300 is coupled to SES 306, via "link adapter" 308, also known as a "channel path" by those skilled in the art, while CPC 302 is coupled to SES 306 via link adapter 310. CPC 304 is coupled to SES 306, via link adapter 312. Utilizing shared storage, as provided by SES 306, permits a form of distributed-processing between the CPCs. Each CPC within the network is registered to SES 306 and the microcode within SES 306. A SES may be constructed as disclosed in pending application Ser. No. 07/860,803, entitled "METHOD AND APPARATUS FOR COUPLING DATA PROCESSING SYSTEMS", filed on Mar. 30, 1992. The disclosed application is assigned to the same assignee as in this application and the disclosure of which is incorporated by reference herein. Other features of SES are described in the following pending applications which are hereby incorporated by reference: "CONFIGURABLE, RECOVERABLE PARALLEL BUS" by N. G. Bartow et al., Ser. No. 839,657, filed: Feb. 20, 1992; "HIGH PERFORMANCE INTERSYSTEM COMMUNICATIONS FOR DATA PROCESSING SYSTEMS" by N. G. Bartow et al., Ser. No. 839,652, filed: Feb. 20, 1992; and "FRAME-GROUP TRANSMISSION AND RECEPTION FOR PARALLEL/SERIAL BUSES", Ser. No. 839,986, filed: Feb. 20, 1992; "COMMUNICATING MESSAGES BETWEEN PROCESSORS AND A COUPLING FACILITY" by D. A. Elko et al., Ser. No. 860,380; "SYSPLEX SHARED DATA COHERENCY METHOD AND MEANS" by D. A. Elko et al., Ser. No. 860,805; "METHOD AND APPARATUS FOR DISTRIBUTED LOCKING OF SHARED DATA, EMPLOYING A CENTRAL COUPLING FACILITY" by D. A. Elko., Ser. No. 860,808; "COMMAND QUIESCE FUNCTION" by D. A. Elko et al., Ser. No. 860,330; "STORAGE MANAGEMENT FOR A SHARED ELECTRONIC STORAGE CACHE" by D. A. Elko et al., Ser. No. 860,807; "MANAGEMENT OF DATA MOVEMENT FROM A SES CACHE TO DASD" by D. A. Elko et al., Ser. No. 860,806; "COMMAND RETRY SYSTEM" by D. A. Elko et al., Ser. No. 860,378; "INTEGRITY OF DATA OBJECTS USED TO MAINTAIN STATE INFORMATION FOR SHARED DATA AT A LOCAL COMPLEX" by D. A. Elko et al., Ser. No. 860,800; "MANAGEMENT OF DATA OBJECTS USED TO MAINTAIN STATE INFORMATION FOR SHARED DATA AT A LOCAL COMPLEX" by J. A. Frey et al., Ser. No. 860,797; "RECOVERY OF DATA OBJECTS USED TO MAINTAIN STATE INFORMATION FOR SHARED DATA AT A LOCAL COMPLEX" by J. A. Frey et al., Ser. No. 860,647; "MESSAGE PATH MECHANISM FOR MANAGING CONNECTIONS BETWEEN PROCESSORS AND A COUPLING FACILITY" by D. A. Elko et al., Ser. No. 860,646; "METHOD AND APPARATUS FOR NOTIFICATION OF STATE TRANSITIONS FOR SHARED LISTS OF DATA ENTRIES" by J. A. Frey et al., Ser. No. 860,809; "METHOD AND APPARATUS FOR PERFORMING CONDITIONAL OPERATIONS ON EXTERNALLY SHARED DATA" by J. A. Frey et al., Ser. No. 860,655; "APPARATUS AND METHOD FOR LIST MANAGEMENT IN A COUPLED DP SYSTEM" By J. A. Frey et al., Ser. No. 860,633; and "INTERDICTING I/O AND MESSAGING OPERATIONS IN A MULTI-SYSTEM COMPLEX" by D. A. Elko et al., Ser. No. 860,489.

The CPCs in this data processing system utilize microcode running within a logical partition as a way of allocating processor resources in accordance with a preferred embodiment of the present invention. CPC 300 includes SVP/CP in logical partition 200 to process service processor requests. Logical partitions 202, 204, and 206 may run other operating systems in accordance with a preferred embodiment of the present invention. CPC 302 is running SVP/CP in logical partition 208. Other operating systems are executing on logical partitions 210, 212, and 214. Similarly, CPC 304 is running SVP/CP in logical partition 216. As with the other CPCs, other operating systems are running on logical partitions 218, 220, and 222 in accordance with a preferred embodiment of the present invention.

External time reference (ETR) 314 is a global timing reference unit utilized to provide a common reference point for CPCs 300, 302, and 304. CPC 300 is coupled to local area network (LAN) 316 via LAN bus adapter (LBA) 318 connecting LAN 316 to port 320 of CPC 300. CPC 302 is connected to LAN 316 through LBA 322, which is coupled to port 324. Similarly, port 326 of CPC 304 is connected to LAN 316 via LBA 328. Each of these ports are connected to a bus within a CPC that provides a communications channel to the other hardware elements within the CPC. LBAs 318, 322, and 328 serve as translators between bus and LAN data formats and protocols and are well known in the art. Each CPC LBA is attached to a bus coupled to all hardware elements within each CPC and the service processor/control program (SVP/CP) located in the hardware system area (HSA). Each LBA converts protocols from the processor type within each CPC into the protocols utilized on LAN 316 such that the CPCs may communicate with devices connected to LAN 316, in accordance with a preferred embodiment of the present invention. The LBAs also translate protocols from LAN 316 to the protocols utilized by the processor types within each CPC. As a result, communications in both directions is possible in accordance with a preferred embodiment of the present invention.

Hardware service element (HSE) 330 is the primary HSE while HSE 332 is the secondary or backup HSE in accordance with a preferred embodiment of the present invention. The pair of HSEs are associated with console 334, telecommunications (TP) port 336 and DASD 338, which are coupled to the HSE's via LAN 316.

Figure 1:
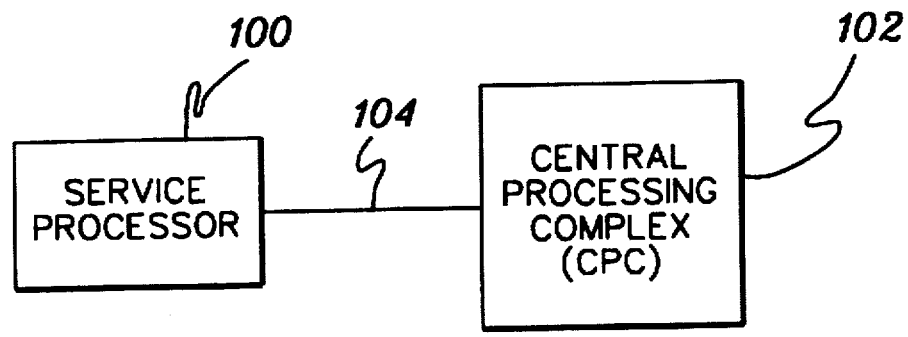
FIG. 1 depicts a conventional service processor configuration known in the prior art.

HSE 330 and 332, service processors external to the CPCs, are utilized to back up the coupled CPCs during steady state operation. HSE 330 and 332 also perform power up and initialization of the first CPC. After initialization of the first CPC, that CPC initializes the rest of the CPCs in the network in accordance with a preferred embodiment of the present invention. LAN 316 also connects HSE 332 and 330 to ETR 314 through LAN bus adapter 340. HSE 330 and 332 are coupled to SES 306 via LAN bus adapter 342. Unlike the configuration in FIG. 1, where the HSE is connected to the elements of a CPC via a service channel, LAN 316 now performs the service channel function, interconnecting the elements of all CPCs and the HSEs 330 and 332 in accordance with a preferred embodiment of the present invention. Although the depicted embodiment only employs two HSEs, other numbers of HSEs may be utilized in accordance with a preferred embodiment of the present invention, including the case of no HSEs at all (provided that at least one CPC includes a start-up means).

As mentioned before, each CPC includes a layer of microcode called the service processor/control program (SVP/CP) that performs the functions of a service processor in response to service processor requests in accordance with a preferred embodiment of the present invention. When a particular service processor function is to be executed by a service processor, a certain percentage of CPU time is spent executing that function within a CPC. Communications between the various CPCs may be managed through SES 306. In particular, these communications between the CPCs include, for example: (1) communicate remote service processor requests and responses, (2) communicate SVP/CP polling signals, (3) make available CPC configuration data, and (4) register all service processor requests.

If a particular CPC is unable to handle its own service processor request internally, the service processor request may be sent through SES 306 to the other CPCs for handling of the service processor request. If none of the other CPC's are capable of handling the service processor request, the service processor request may be sent to HSE 330 in accordance with a preferred embodiment of the present invention. As a result, various paths for handling service processor requests may be followed depending on the service processor request type and the state of the network in accordance with a preferred embodiment of the present invention. A service processor request may be handled locally and executed by the local CPC on the SVP/CP. A service processor request also may be handled remotely when the CPC is unable to process its own service processor request internally. In such a situation, the service processor request may be communicated to the SES and executed remotely by the SVP/CP of another CPC.

Other reasons for processing a service processor request by another CPC includes the CPC originating the service processor request having sufficient processing resources, but sending the request out for processing by another CPC that is under loaded. Additionally, service processor request may be sent to other CPCs that are more suited to perform a particular function, such as, for example, a CPC may have hardware of software within it making that CPC more suited for performing a particular service processor request.

An example of one type of service processor request involves the recovery and/or initialization of a CPC by another CPC. Such a service processor request may be communicated via the LAN or SES and executed remotely by the SVP/CP of another CPC. The HSE also may be utilized to back up service processor requests if none of the CPCs can handle the request. Such requests are communicated via the LAN/SES and executed remotely by the HSE. In particular, these service processor requests include, for example,: (1) initialization/power up of the first CPC; (2) single node operation; (3) recovery of a CPC by an HSE in cases where recovery of a CPC by a CPC is not possible; and (4) SVPICP nonrecovery service processor requests in cases where CPC's cannot perform the service processor requests. Additionally, each service processor request to a SVP/CP is registered in the SES, thus permitting another CPC to takeover performance of the service processor request if the executing CPC fails during the processing of the service processor request in accordance with a preferred embodiment of the present invention.

If a particular CPC's microcode fails, a takeover may be automatically performed by another CPC or by the HSE if no other CPCs are available to handle the takeover in accordance with a preferred embodiment of the present invention. The SVP/CP that fails goes through a warm start, which consists of the particular SVP/CP reinitializing itself or being reinitialized by another CPC or the HSEs.

Figure 3B:
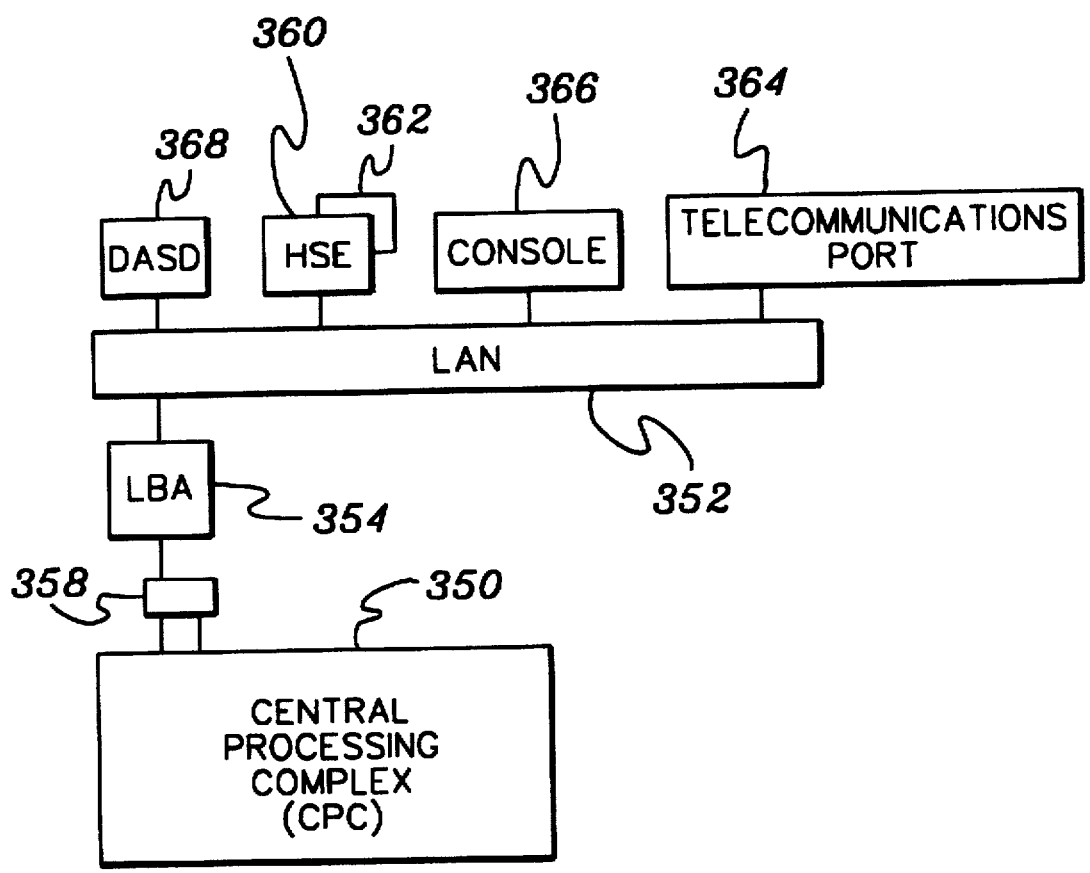
FIG. 3B is a block diagram of a single CPC system in accordance with a preferred embodiment of the present invention.

The data processing system depicted in FIG. 3A illustrates a multi-CPC configuration. A single CPC system configuration also is possible in accordance with a preferred embodiment of the present invention. FIG. 3B is a block diagram illustrating a single CPC system in accordance with a preferred embodiment of the present invention. CPC 350 is connected to LAN 352 preferably via LAN bus adapter 354, which is connected to a bus in CPC 350 via port 358. LAN 352 has HSE 360 and 362 connected to it. TP port 364, console 366, and DASD 368 are also connected to HSE 360 and 362 via LAN 352. LAN 352 performs the service channel function and interconnecting elements of the CPC and HSEs 360 and 362. LBA 354 translates information going to and from CPC 350 into the LAN protocol for LAN 352. LBA 354 is connected to port 358, which is connected to a bus that is directly coupled to all hardware elements within CPC 350 and SVP/CP.

Figure 4A:
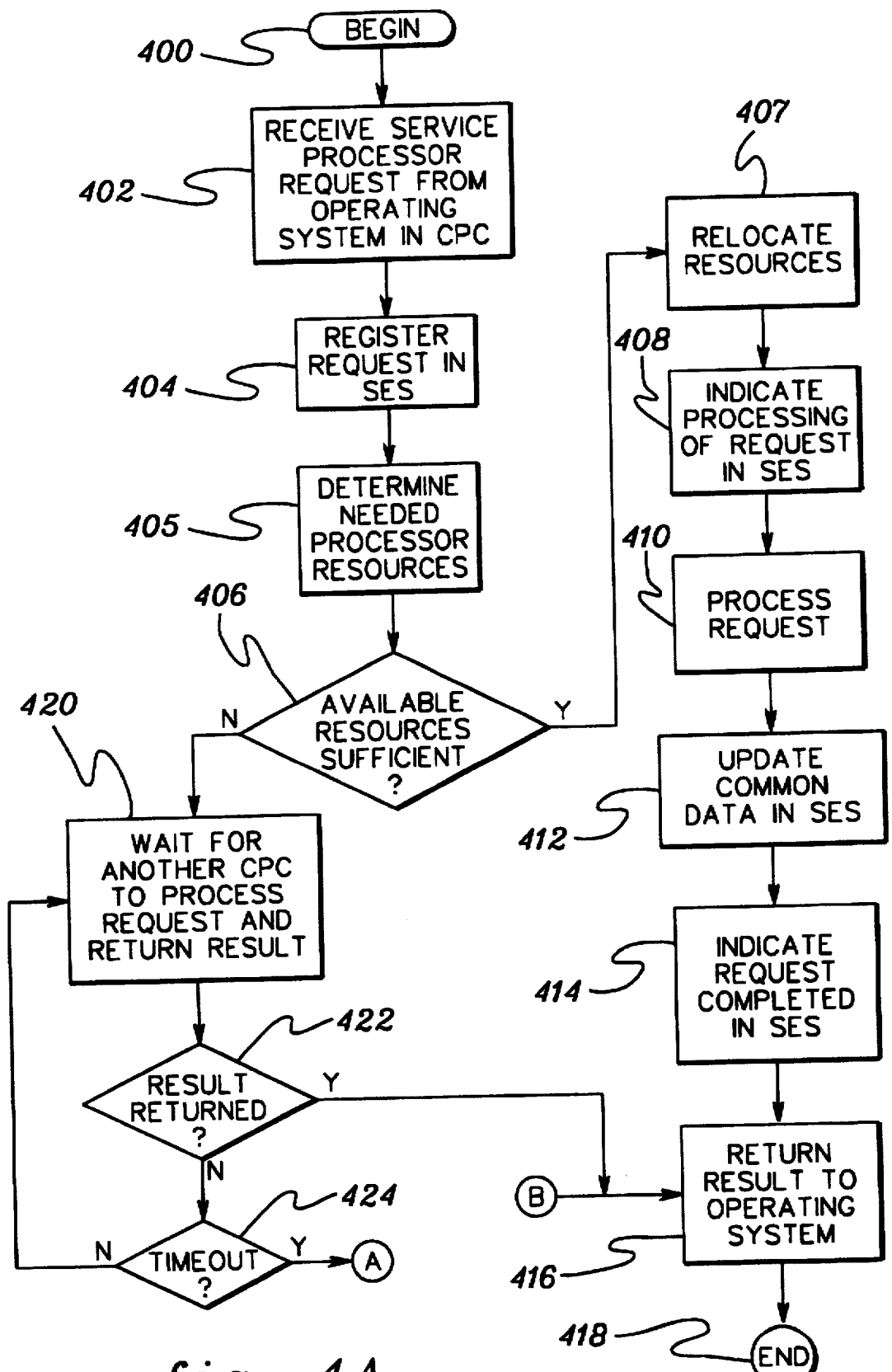
FIGS. 4A and 4B form a high level flowchart illustrating a method and system for processing requests within a CPC in accordance with a preferred embodiment of the present invention.
Figure 4B:
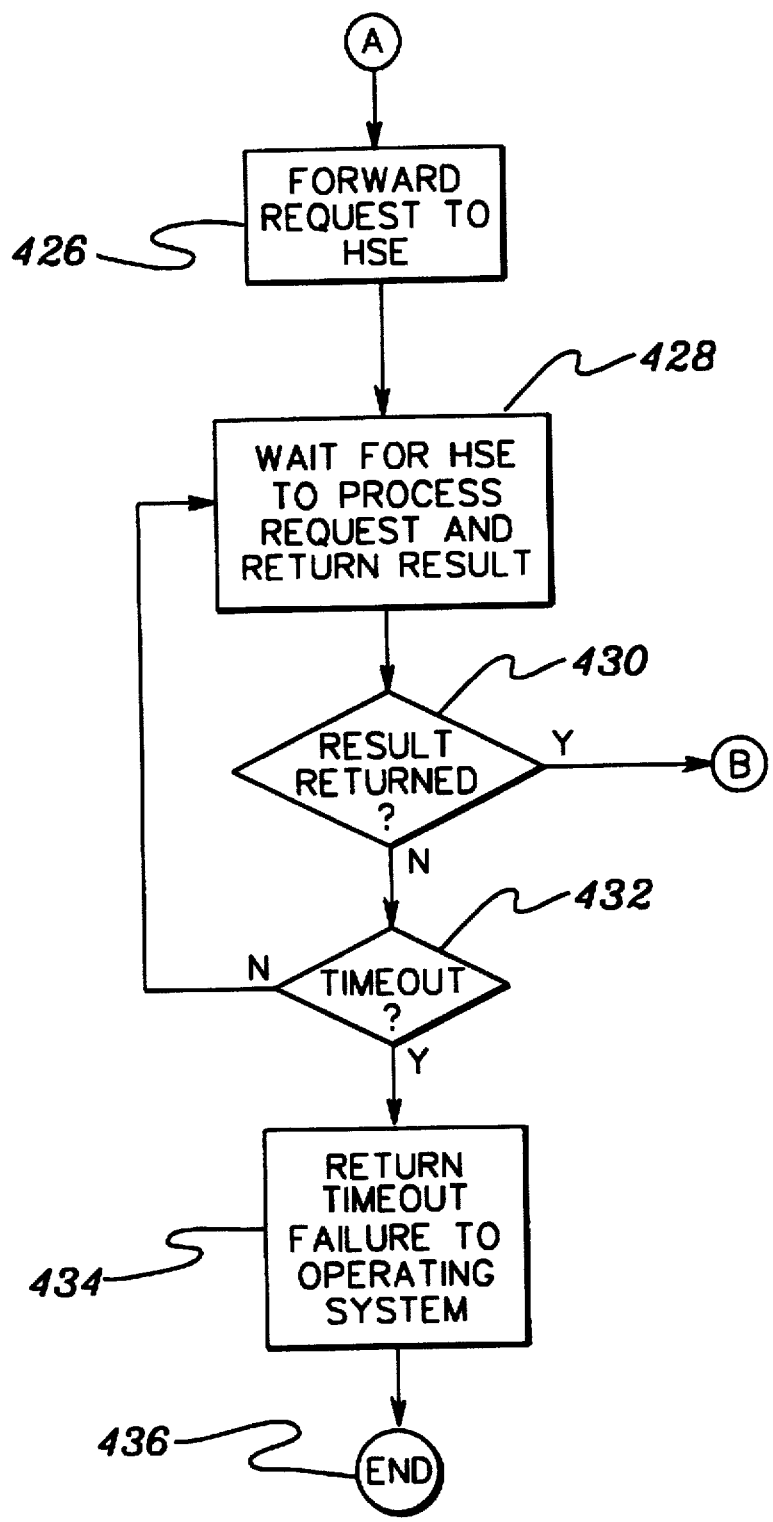

Referring now to FIGS. 4A and 4B, a high level flowchart illustrating a method and system for processing service processor requests within the SVP/CP in the central processors in a CPC in accordance with a preferred embodiment of the present invention is depicted. As illustrated, the process begins in block 400 and thereafter proceeds to block 402. Block 402 depicts the receiving of a service processor request from the operating system within the CPC. Thereafter, the process proceeds to block 404, which illustrates the registration of the request within the SES. Registration of a request within the SES may be accomplished, for example, placing the request into the SES and setting a flag or placing a message in the SES.

Thereafter, the process proceeds to block 405, which depicts the determination of needed processor resources for processing the service processor requests. The process passes to block 406. Block 406 illustrates a determination of whether or not the available processor resources are sufficient to process the service processor request. If the resources are sufficient, the process then proceeds to block 407, which depicts the allocation of processor resources for processing the service processor request in accordance with a preferred embodiment of the present invention. Those skilled in the art will realize that other methods for allocating resources may be utilized, such as, for example, allocating available resources prior to receiving a service processing request.

The process then proceeds to block 408, which illustrates indicating within the SES that the CPC is processing the service processor request. Indications in the SES may be made by placing a message, flag, or some other data recognizable by the other CPCs in accordance with a preferred embodiment of the present invention. The process then advances to block 410, which depicts the processing of the service processor request within the processors of the CPC.

Next, the process passes to block 412. Block 412 illustrates updating the SES with any common data that may result from processing the service processor request. The process then passes to block 414, which depicts marking the service processor request as completed in the SES. The process then proceeds to block 416, which illustrates the returning of the result to the operating system. The process then terminates as depicted in block 418.

Referring back to block 406, if the processor resources are insufficient to process the service processor request, the process then passes to block 420. Block 420 illustrates the process waiting for another CPC to process the service processor request and return a result. The process next proceeds to block 422, which depicts a determination of whether or not a result has been returned by another CPC. If a result has been returned by another CPC, the process then proceeds to block 416. Block 416 illustrates the returning of the result to the operating system with the process terminating thereafter in block 418.

Referring back to block 422, if a result has not been returned by another CPC, the process then proceeds to block 424, which illustrates a determination of whether or not a timeout has occurred. A "timeout" is a time period in which a service processor request should have been processed by another CPC in accordance with a preferred embodiment of the present invention. An assumption is made that if a greater period of time than the timeout has passed, the service processor request cannot be fulfilled in accordance with a preferred embodiment of the present invention. If a timeout has not occurred the process returns to block 420 to wait for another CPC to process the service processor request and to determine whether a result has been returned.

Referring back to block 424, if a timeout has occurred, the process then passes to block 426 in FIG. 4B via connector A. Block 426 depicts the forwarding of the service processor request to the HSE. Afterward, the process advances to block 428, which illustrates waiting for the HSE to process the service processor request and return a result. The process then passes to block 430, which depicts a determination of whether or not a result has been returned. If a result has been returned, the process then proceeds to block 416, illustrating the returning of the result to the operating system, via connector B. Thereafter, the process terminates as illustrated in block 418.

Referring back to block 430, if a result has not been returned, the process then advances to block 432, which illustrates a determination of whether or not a timeout has occurred. If a timeout has not occurred, the process then returns to block 428. Upon the occurrence of a timeout, the process then advances to block 434. Block 434 depicts returning a "timeout" failure message to the operating system. Thereafter, the process terminates as illustrated in block 436.

Figure 5:
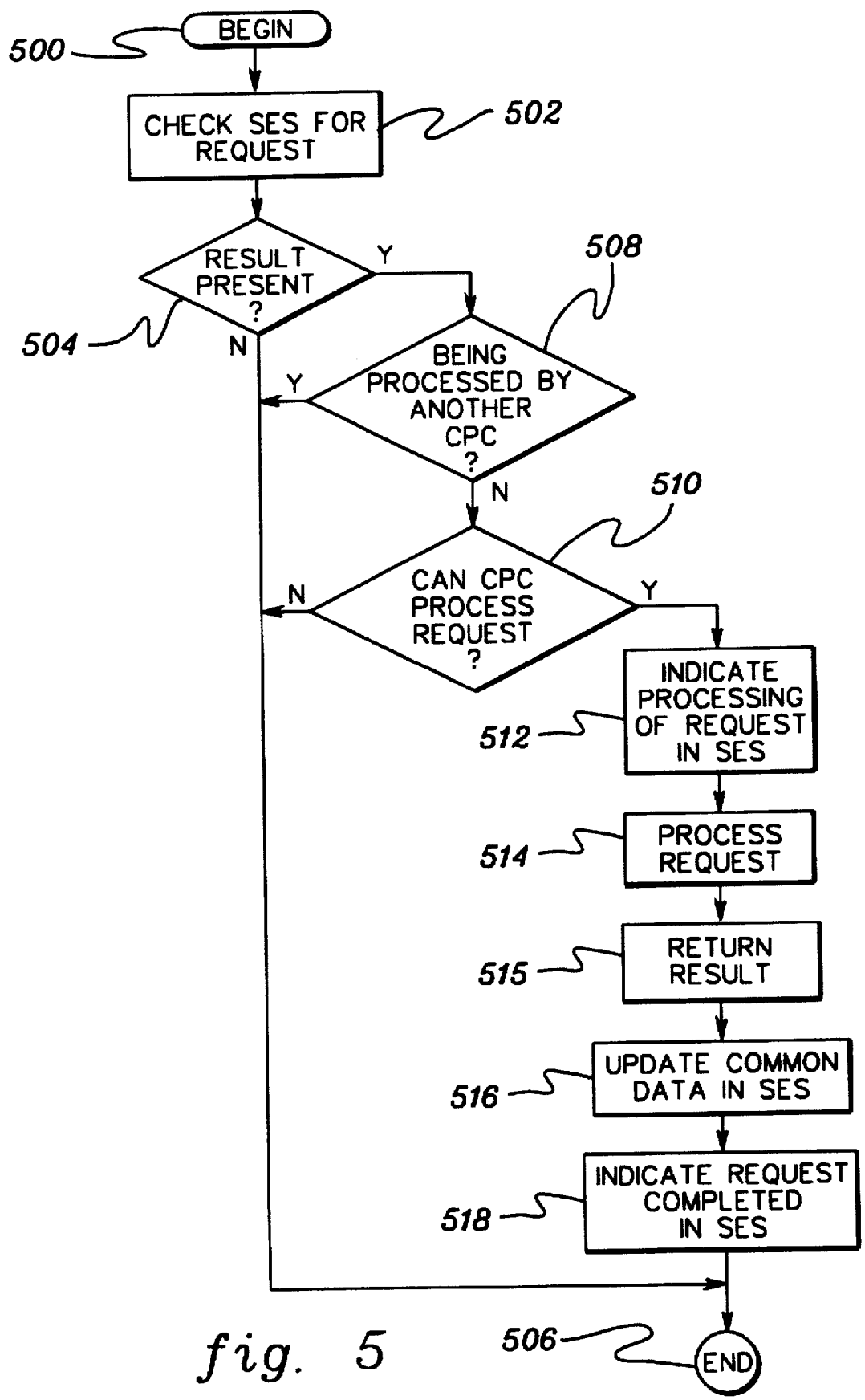
FIG. 5 depicts a high level flowchart illustrating a method and system for SES polling for service processor requests by a CPC in accordance with a preferred embodiment of the present invention.

With reference now to FIG. 5, a high level flowchart illustrating a method and system for SES polling for service processor requests by a CPC in accordance with a preferred embodiment of the present invention is depicted. As illustrated, the process begins in block 500 and thereafter proceeds to block 502, which depicts the checking of the SES for a service processor request. Afterward, the process proceeds to block 504. Block 504 illustrates a determination of whether or not a service processor request is present in the SES. If a request is not present, the process terminates as illustrated in block 506.

Referring back to block 504, if a service processor request is present, the process then passes to block 508. Block 508 depicts a determination of whether or not the service processor request is currently being processed by another CPC. If the service processor request is being processed by another CPC, the process then terminates in block 506. If, however, the service processor request is not being processed by another CPC, the process passes to block 510, which illustrates a determination of whether or not the CPC is able to process the service processor request. If the CPC is unable to process the service processor request, the process again terminates in block 506. If, however, the CPC is able to process the request, the process then proceeds to block 512. Block 512 depicts indicating in the SES that the CPC is processing the service processor request.

Next, the process passes to block 514, which illustrates the processing of the service processor request in the CPC. The process then proceeds to block 515, which depicts the returning of the result from processing the service processor request to the requesting operating system by placing the result in the SES. Thereafter, the process advances to block 516, which illustrates the updating of the SES with common data resulting from processing the service processor request. The process then proceeds to block 518, which depicts indicating that the service processor request has been completed in the SES. The SVP/CP in the CPC containing the operating system making the service processor request will check the SES for the result and return it to the operating system. Afterward, the process terminates as illustrated in block 506.

The method and system depicted in the flowcharts illustrate the processing of service processor requests originating from an operating system in accordance with a preferred embodiment of the present invention. Those of ordinary skill in the art will realize that service processor requests originating from sources other than an operating system may be processed in accordance with a preferred embodiment of the present invention.

Figure 6:
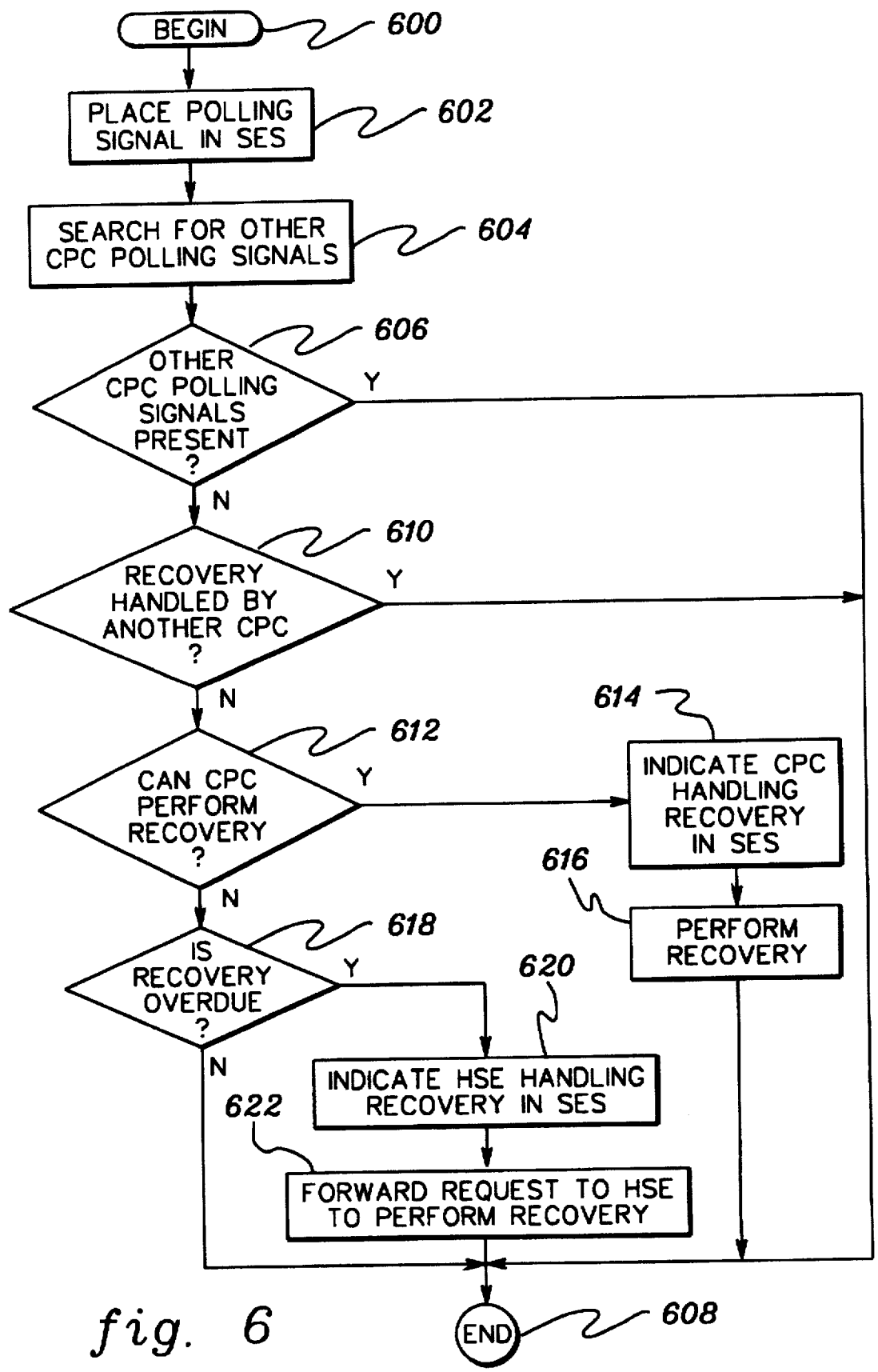
FIG. 6 a high level flowchart illustrating a method and system for a CPC to poll other CPCs to determine the status of CPCs in accordance with a preferred embodiment of the present invention.

Referring now to FIG. 6, a high level flowchart illustrating a method and system for a CPC to poll other CPCs to determine the status of CPCs in accordance with a preferred embodiment of the present invention is depicted. This flowchart depicts the process followed by a CPC within a network of multiple CPCs.

The process begins as illustrated in block 600 and thereafter proceeds to block 602, which depicts the placement of a polling signal for a CPC in the SES. The polling signal is a presence indicator analogous to a "heartbeat" for other CPCs to determine whether the CPC is still functioning properly. Afterward, the process proceeds to block 604, which illustrates the CPC searching for other CPC polling signals in the SES. The process then passes to block 606, which depicts a determination of whether or not a CPC polling signal is missing from the SES. If all the other CPCs polling signals are present, the process terminates as illustrated in block 608. If, however, a CPC's polling signal is missing from the SES, the CPC whose signal is missing requires a recovery. The process then advances to block 610, which depicts a determination of whether or not a recovery is being handled by another CPC.

Handling of a recovery by another CPC results in the process terminating again in block 608. If a recovery is not being handled by another CPC, the process then proceeds to block 612, which illustrates a determination of whether or not the CPC can perform, the recovery. If the CPC can perform the recovery, the process then proceeds to block 614, which depicts the placement of a message in the SES by the CPC indicating that the recovery is being handled by it. Afterward, the process proceeds to block 616. Block 616 illustrates the CPC performing the recovery with the process terminating thereafter in block 608.

Referring back to block 612, if the CPC cannot perform the recovery, the process then proceeds to block 618, which depicts a determination of whether the recovery is overdue. If the recovery is overdue, the process then proceeds to block 620. Block 620 illustrates the placement of a message in the SES indicating that the HSE will be handling the recovery of the failed CPC. Thereafter, the process advances to block 622, which depicts the forwarding of a service processor request to the HSE to perform the recovery. Thereafter, the process terminates in block 608. Referring back to block 618, if the recovery is not overdue the process terminates in block 608.

One advantage of the present invention is the elimination of the requirement for multiple, physically separate, service processor machines for each CPC. Another result of this is that service processor hardware is less expensive. An additional advantage is service processor requests are executed at CPC processor speeds instead of HSE service processor speeds.

A further advantage of the present invention is that service processor requests may be distributed across the data processing system when the local CPC is unavailable for processing. Additionally, multiple requests per CPC may be processed at a single time.

Furthermore, service processor recovery backup is N minus one CPC level backups plus the pair of HSEs (second backup) in accordance with a preferred embodiment of the present invention, and service processor storage is no longer a constraint utilizing the data processing system of the present invention since resources from all of the CPCs may be utilized. In addition, requests may be transmitted at greater speeds.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a method for handling an active service processor request ("SPR") emanating from at least one central processing complex in the system, the system having therein a plurality of SPR processing resources, the method comprising:

(a) determining a type of the active SPR, including determining a type of resources required to process the active SPR;

(b) determining a suitability of at least some SPR processing resources of the plurality of SPR processing resources to handle the active SPR, based on at least their respective intrinsic SPR processing capabilities and the type of resources required to process the active SPR;

(c) using result of said determine (a) and said determining (b) to determine a preferred SPR processing resource of the plurality of SPR processing resources within which to process the active SPR; and (d) processing the active SPR in said preferred SPR processing resource.

2. The method of claim 1, further comprising:

(e) prior to said processing the active SPR (d), allocating resources required to process the active SPR within the preferred SPR processing resource.

3. The method of claim 1, wherein said determining the suitability (b) includes:

determining a dynamic capability of the at least some SPR processing resources of the plurality of SPR processing resources to handle the active SPR, based on at least respective dynamic processing loads of the at least some SPR processing resources.

4. The method of claim 3, wherein the at least some SPR processing resources includes a first central processing complex and a hardware system element, and wherein said using the results (c) includes:

determining that the preferred processing resource within which to process the active SPR is the hardware system element, upon a determination in said determining (b) that the first central processing complex is unsuitable to process the active SPR based on either its intrinsic SPR processing capabilities or its dynamic processing load.

11

5. The method of claim 3, wherein the at least some SPR processing resources includes a first central processing complex and a second central processing complex, and wherein said using the results (c) includes:

determining that the preferred processing resource within which to process the active SPR is the second central processing complex, upon a determination in said determining (b) that the first central processing complex is unsuitable to process the active SPR based on either its intrinsic SPR processing capabilities or its dynamic processing load.

6. An apparatus for handling an active service processor request ("SPR") emanating from at least one central processing complex in a data process system, the system having therein a plurality of SPR based on either its intrinsic SPR processing resources, the apparatus comprising:

(a) means for determining a type of the active SPR, including means for determining a type of resources required to process the active SPR;

(b) means for determining a suitability of at least some SPR processing resources of the plurality of SPR processing resources to handle the active SPR, based on at least their respective intrinsic SPR processing capabilities and the type of resources required to process the active SPR;

(c) means for using results provided by said means for determining (a) and said means for determining (b) to determine a preferred SPR processing resource of the plurality of SPR processing resources within which to process the active SPR; and (d) means for processing the active SPR in said preferred SPR processing resource.

7. The apparatus of claim 6, further comprising:

means for allocating resources required to process the active SPR within the preferred SPR processing resource.

8. The apparatus of claim 6, wherein said means for determining the suitability (b) includes:

means for determining a dynamic capability of the at least some SPR processing resources of the plurality of SPR processing resources to handle the active SPR, based on at least respective dynamic processing loads of the at least some SPR processing resources.

9. The apparatus of claim 8, wherein the at least some SPR processing resources includes a first central processing complex and a hardware system element, and wherein said means for using the results (c) includes:

means for determining that the preferred processing resource within which to process the active SPR is the hardware system element, upon a determination by said means for determining (b) that the first central processing complex is unsuitable to process the active SPR based on either its intrinsic SPR processing capabilities or its dynamic processing load.

10. The apparatus of claim 8, wherein the at least some SPR processing resources includes a first central processing complex and a second central processing complex, and wherein said means for using the results (c) includes:

means for determining that the preferred processing resource within which to process the active SPR is the second central processing complex, upon a determination by said means for determining (b) that the first central processing complex is unsuitable to process the active SPR based on either its intrinsic SPR processing capabilities or its dynamic processing load.

11. An article of manufacture comprising:

a computer usable medium having computer readable program code means embodied therein for handling an active service processor request ("SPR") emanating from at least one central processing complex in a data process system, the system having therein a plurality of SPR processing resources, the computer usable medium comprising:

(a) computer readable program code means for determining a type of the active SPR, including computer readable program code means for determining a type of resources required to process the active SPR;

(b) computer readable program code means for determining a suitability of at least some SPR processing resources of the plurality of SPR processing resources to handle the active SPR, based on at least their respective intrinsic SPR processing capabilities and the type of resources required to process the active SPR;

(c) computer readable program code means for using results provided by said computer readable program code means for determining (a) and said computer readable program code means for determining (b) to determine a preferred SPR processing resource of the plurality of SPR processing resources within which to process the active SPR; and (d) computer readable program code means for processing the active SPR in said preferred SPR processing resource.

12. The article of manufacture of claim 11, further comprising:

computer readable program code means for allocating resources required to process the active SPR within the preferred SPR processing resource.

13. The article of manufacture of claim 11, wherein said code means for determining the suitability (b) includes:

computer readable program code means for determining a dynamic capability of the at least some SPR processing resources of the plurality of SPR processing resources to handle the active SPR, based on at least respective dynamic processing loads of the at least some SPR processing resources.

14. The article of manufacture of claim 13, wherein the at least some SPR processing resources includes a first central processing complex and a hardware system element, and wherein said code means for using the results (c) includes:

computer readable program code means for determining that the preferred processing resource within which to process the active SPR is the hardware system element, upon a determination by said computer readable program code means for determining (b) that the first central processing complex is unsuitable to process the active SPR based on either its intrinsic SPR processing capabilities or its dynamic processing load.

15. The article of manufacture of claim 13, wherein the at least some SPR processing resources includes a first central processing complex and a second central processing complex, and wherein said computer readable program code means for using the results (c) includes:

computer readable program code means for determining that the preferred processing resource within which to process the active SPR is the second central processing complex, upon a determination by said computer readable program code means for determining (b) that the first central processing complex is unsuitable to process the active SPR based on either its intrinsic SPR processing capabilities or its dynamic processing load.

* * * * *